United States Patent
Taylor et al.

(10) Patent No.: US 7,769,045 B2
(45) Date of Patent: Aug. 3, 2010

(54) METHOD AND APPARATUS FOR PROCESSING HEADER BITS AND PAYLOAD BITS

(75) Inventors: Carolyn Taylor, Chicago Heights, IL (US); Yi Qiao, Hoffman Estates, IL (US); Mang Zhu, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 1293 days.

(21) Appl. No.: 10/797,379

(22) Filed: Mar. 10, 2004

(65) Prior Publication Data

US 2005/0201286 A1 Sep. 15, 2005

(51) Int. Cl.
*H04J 3/24* (2006.01)
(52) U.S. Cl. ............................ 370/474; 370/476
(58) Field of Classification Search ................ 370/229, 370/235, 310, 349, 230, 392, 394, 473, 474, 370/476, 535, 389, 393, 471
See application file for complete search history.

(56) References Cited

U.S. PATENT DOCUMENTS

| | | | | |
|---|---|---|---|---|
| 4,827,475 | A * | 5/1989 | Grover et al. | 370/527 |
| 5,228,028 | A * | 7/1993 | Cucchi et al. | 370/392 |
| 6,591,299 | B2 * | 7/2003 | Riddle et al. | 709/224 |
| 6,598,034 | B1 * | 7/2003 | Kloth | 706/47 |
| 6,625,226 | B1 * | 9/2003 | Gersho et al. | 375/285 |
| 6,798,743 | B1 * | 9/2004 | Ma et al. | 370/235 |
| 6,885,638 | B2 * | 4/2005 | Xu et al. | 370/230 |
| 7,146,312 | B1 * | 12/2006 | Demetrescu et al. | 704/229 |
| 7,263,064 | B2 * | 8/2007 | Yoshimura et al. | 370/235 |
| 2001/0033560 | A1 * | 10/2001 | Tong et al. | 370/337 |
| 2002/0006138 | A1 | 1/2002 | Odenwalder | |
| 2002/0163909 | A1 * | 11/2002 | Sarkinen et al. | 370/386 |
| 2003/0081592 | A1 * | 5/2003 | Krishnarajah et al. | 370/352 |
| 2003/0123452 | A1 * | 7/2003 | Cox et al. | 370/395.43 |
| 2004/0100908 | A1 * | 5/2004 | Khosravi et al. | 370/235 |

FOREIGN PATENT DOCUMENTS

| | | |
|---|---|---|
| EP | 1 443 784 A | 8/2004 |
| WO | WO 03/041437 A1 | 5/2003 |

OTHER PUBLICATIONS

"Adaptive Multi Rate (AMR) Study Phase Report, Version 1.0", XP-002249766, ETSI TC-SMG, Meeting No. 23, Oct. 13, 1997, pp. 1-38.

(Continued)

*Primary Examiner*—Ricky Ngo
*Assistant Examiner*—Wei-Po Kao
(74) *Attorney, Agent, or Firm*—Hisashi D. Watanabe

(57) ABSTRACT

A method (200) and an apparatus (500) in a packet switched data transfer system for processing header bits and payload bits in a frame of bits are disclosed. The header bits are classified into a first predetermined class of bits and into a second predetermined class of bits (204), the payload bits are classified into the first predetermined class of bits and into the second predetermined class of bits (206), the first predetermined class of bits are processed in accordance with a first predetermined mechanism (208), and the second predetermined class of bits are processed in accordance with a second predetermined mechanism (210).

10 Claims, 5 Drawing Sheets

OTHER PUBLICATIONS

Sjoberg, J.; Westerlund, M.; Lakaniemi, A; Xie, Q., "Real-Time Transport Protocol (RTP) Payload Format and File Storage Format for the Adaptive Multi-Rate (AMR) and Adaptive Multi-Rate Wideband (AMR-WB) Audio Codecs", Network Working Group, Request for Comments: 3267, Category: Standards Track, 49 pages.

"Proposed Work Item for radio optimization impacts on PS domain architecture", Technical Specification Group Services and Systems Aspects Meeting #14, Kyoto, Japan, Dec. 17-20, 2001, 2 pages.

"3rd Generation Partnership Project; Technical Specification Group Services and System Aspects; IP Multimedia Subsystem (IMS); Stage 2, (Release 6)", EGPP TS 23.228 V6.4.1 (Jan. 2004) Technical Specification, 159 pages.

3rd Generation Partnership Project; Technical Specification Group Services and System Aspects; Mandatory speech codec speech processing functions; Adaptive Multi-Rate (AMR) speech codec frame structure (Release 5), 3GPP TS 26.101 V5.0.0 (Jun. 2002) Technical Specification, 19 pages.

3rd Generation Partnership Project; Technical Specification Group Services and System Aspects/ Quality of Service (QoS) concept and architecture (Release 6), 3GPP TS 23.107 V6.0.0 (Dec. 2003) Technical Specification, 41 pages.

Schulzrinne, H.; Casner, S.; Frederick, R.; Jacobson, V., "RTP: A transport Protocol for Real-Time Applications", Network Working Group, Request for Comments: 1889, Category: Standards Track, Jan. 1996, 75 pages.

"Proposed Work Item for Radio Optimisation Impacts on PS Domain Architecture", Technical Specification Group Services and System Aspects, Dec. 17-20, 2001, pp. 1-3, TSG SA WG2 TSGS #14(01)0721, 7.2.3, Meeting #14, Kyoto, Japan.

* cited by examiner

METHOD AND APPARATUS FOR PROCESSING HEADER BITS AND PAYLOAD BITS

FIELD OF THE INVENTION

The present invention generally relates to packet-switched data transfers, and more specifically to processing of header and payload bits in packet-switched data transfers.

BACKGROUND OF THE INVENTION

Internet Protocol Multimedia Subsystem ("IMS") is considered to be a technology enabler that brings the ability to deliver Internet Protocol ("IP") based real-time person-to-person multimedia communication including voice-over-IP ("VoIP") communication. IMS has a capability to interact with different services and applications, and also to easily set up multiple services in a single session as well as multiple simultaneous synchronized sessions for a user. In Universal Mobile Telecommunications System ("UMTS"), there are four classes of quality of service ("QoS"), or traffic classes, for data traffic as described in 3GPP TS 23.107 V6.0.0, entitled "3rd Generation Partnership Project; Technical Specification Group Services and System Aspects; Quality of Service (QoS) concept and architecture (Release 6)" published by the 3rd Generation Partnership Project ("3GPP"), December 2003, which is herein incorporated by reference. The four QoS classes are: conversational class; streaming class; interactive class; and background class. The conversational class is generally used for telephony speech for real time conversation between live end-users, for example in Global System for Mobile Communications ("GSM"), and may include new applications such as VoIP and video conferencing tools. Because a failure to provide low enough transfer delay will result in unacceptable lack of quality to the end-users, there is a strict limit in acceptable transfer delay for the conversational class. Such IMS voice calls are processes using Adaptive Multi-Rate ("AMR") speech voice encoder/decoder ("codec") frame structure, as described in 3GPP TS 26.101 V5.0.0, entitled "3rd Generation Partnership Project; Technical Specification Group Services and System Aspects; Mandatory speech codec speech processing function; Adaptive Multi-Rate (AMR) speech codec frame structure (Release 5)" published by the 3rd Generation Partnership Project ("3GPP"), June 2002, which is herein incorporated by reference. IMS voice calls are transported over the packet switched ("PS") domain.

Each frame is divided into three parts, which are: AMR Header, AMR Auxiliary Information, and AMR Core Frame. The AMR Header includes the Frame Type and the Frame Quality Indicator fields. The AMR auxiliary information includes the Mode Indication, Mode Request, and Codec Cyclic Redundancy Check ("CRC") fields. The AMR Core Frame includes the speech parameter bits, which are produced by the speech encoder, and are ordered according to their subjective importance. The speech parameter bits are further divided into three classes, Class A, Class B, and Class C according to their subjective importance. Class A contains bits that are most sensitive to errors, and any error in these bits is likely to cause a corrupted speech frame. Class A bits are protected by the Codec CRC in AMR Auxiliary Information. Classes B and C contain bits in which increasing error rates will gradually reduce the speech quality. However, decoding of an erroneous speech frame in Class B or C is usually possible without producing significant degradation. Class B bits are more sensitive to errors than Class C bits. These three classes of bits are subjected to different error protection.

An AMR frame is formed as a combination of AMR Header, AMR Auxiliary Information, and AMR Core Frame in a predetermined arrangement. Although AMR Core Frame may include bits of different classes subject to different error protection, the AMR frame is subjected to a fixed rate speech codec when the AMR frame is transported in the PS domain for real-time packet data.

DETAILED DESCRIPTION OF THE PREFERRED EMBODIMENTS

The present invention provides a method and an apparatus for improving efficiency in packet-switched data transfers by processing header and payload bits of a frame based on their classification. The header bits are classified into a plurality of classes based upon their characteristics or upon their relative importance, such as delay requirement and tolerance to errors. The payload bits are similarly classified into the same plurality of classes based upon their characteristics or upon their relative importance. Once the header and payload bits are classified, the header and payload bits having the same classification are grouped together, and are processed according to a predetermined mechanism specific to the classification. For example, the header and payload bits may be classified into three different classes, Class 1, Class 2, and Class 3. Then the header and payload bits of Class 1 are grouped together and are processed according to a mechanism prescribed specifically for Class 1 bits. Similarly, the header and payload bits of Class 2 are grouped together, as are those of Class 3, and each group of bits is processed according to its corresponding mechanism prescribed specifically for Class 2 bits or Class 3 bits.

Figure 1:
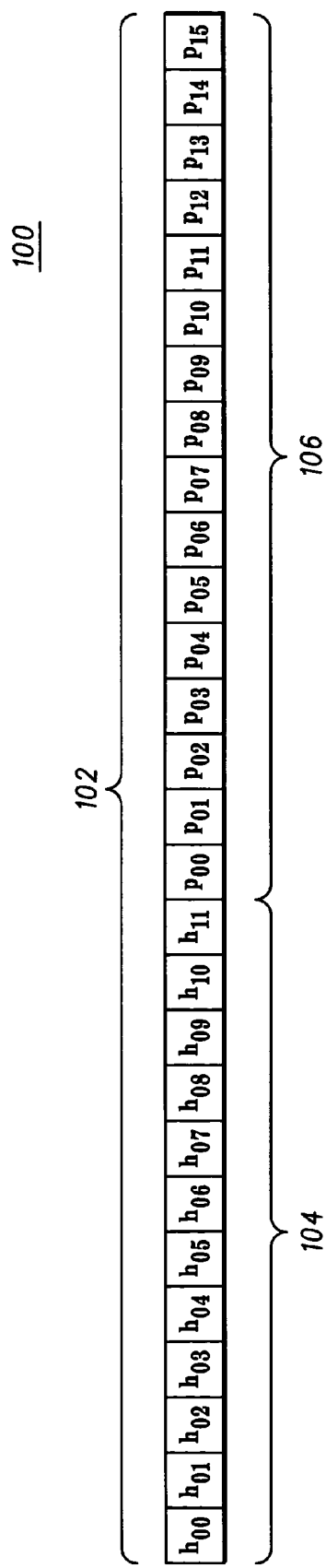
FIG. 1 is an exemplary block diagram of a frame of bits, which may be processed in a packet switched data transfer system in accordance with an embodiment of the present invention.

FIG. 1 is an exemplary block diagram 100 of a frame of bits 102, which may be processed in a packet switched data transfer system in accordance with an embodiment of the present invention. The frame of bits 102 comprises a header field 104, which includes a plurality of header bits, and a payload field 106, which includes a plurality of payload bits. In this example, the header field 104 includes twelve header bits marked from $h_{00}$ to $h_{11}$, and the payload field 106 includes sixteen payload bits marked from $p_{00}$ to $p_{15}$.

Figure 2:
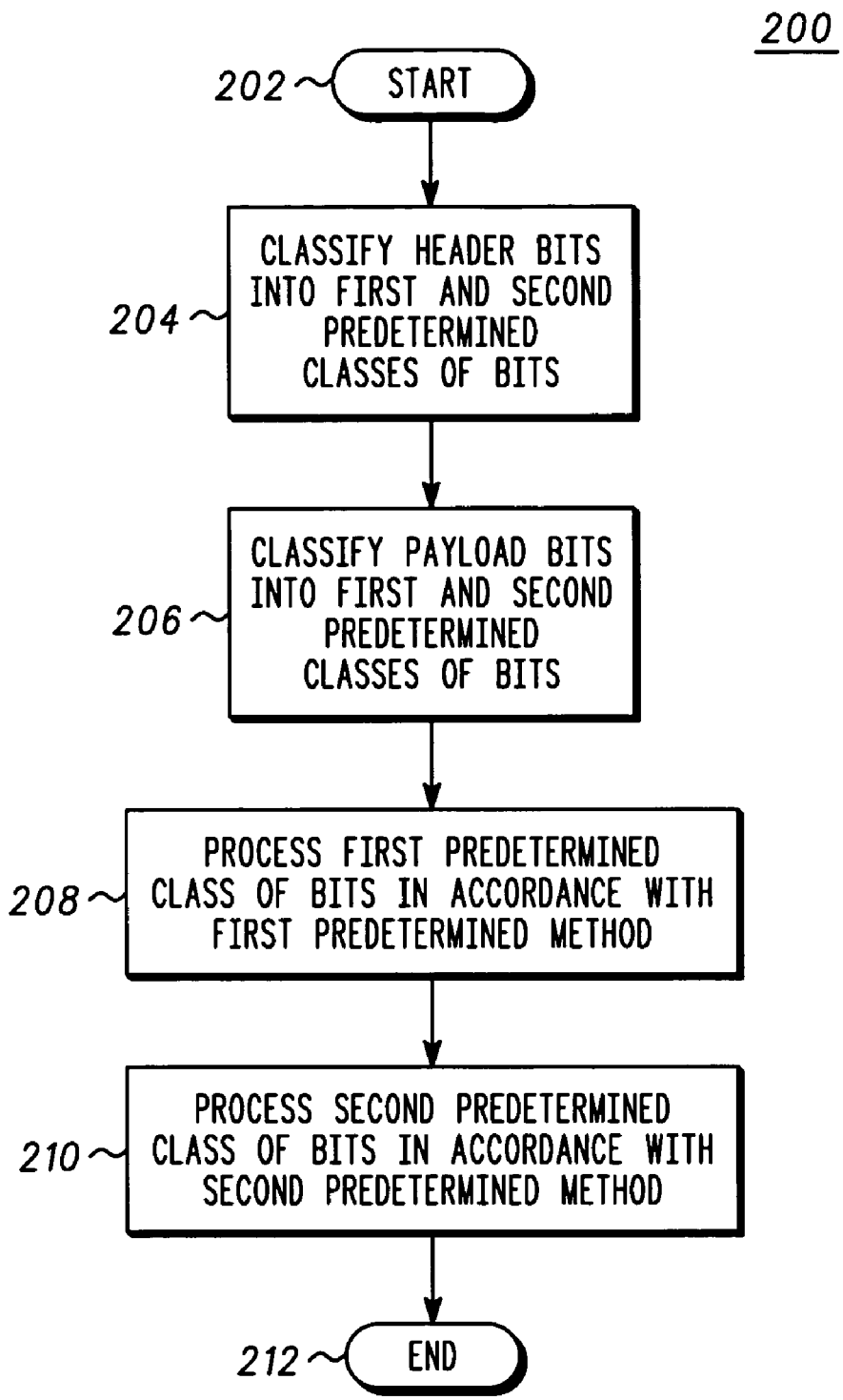
FIG. 2 is an exemplary flowchart of an embodiment in accordance with the present invention for processing header bits and payload bits in a frame of bits such as the frame of bits illustrated in FIG. 1.

FIG. 2 is an exemplary flowchart 200 of an embodiment in accordance with the present invention for processing header bits and payload bits in a frame of bits such as the frame of bits 102 illustrated in FIG. 1. The process begins in block 202.

Although there may be more than two classes of bits, only two classes are used to illustrate an embodiment of the present invention. In block 204, the header bits in the header field 104 are classified into a first predetermined class of bits and into a second predetermined class of bits. In block 206, the payload bits in the payload field 106 are classified into the first predetermined class of bits and into the second predetermined class of bits. The classification of header and payload bits may be based upon several conditions. For example, a classification may be based upon a bit location within its respective field, or it may be based upon a pre-assigned weight of each bit. Then in block 208, the first predetermined class of bits is processed in accordance with a first predetermined mechanism which is specific to the first predetermined class of bits, and the second predetermined class of bits is processed in accordance with a second predetermined mechanism which is specific to the second predetermined class of bits in block 210. The first and second predetermined mechanisms may be various data processing mechanisms such as, but not limited to, error protection algorithms where a first error protection algorithm of the first predetermined mechanism has a different protection level from that of a second error protection algorithm of the second predetermined mechanism, grouping of the first predetermined class of bits and grouping of the second predetermined class of bits, or any other, or combination thereof, applicable data processing mechanisms. The process then terminates in block 212. A new frame of bits may be constructed based upon the processed first and second classes of bits, the grouped first and second classes of bits, or based upon the grouped-and-processed first and second classes of bits.

Figure 3:
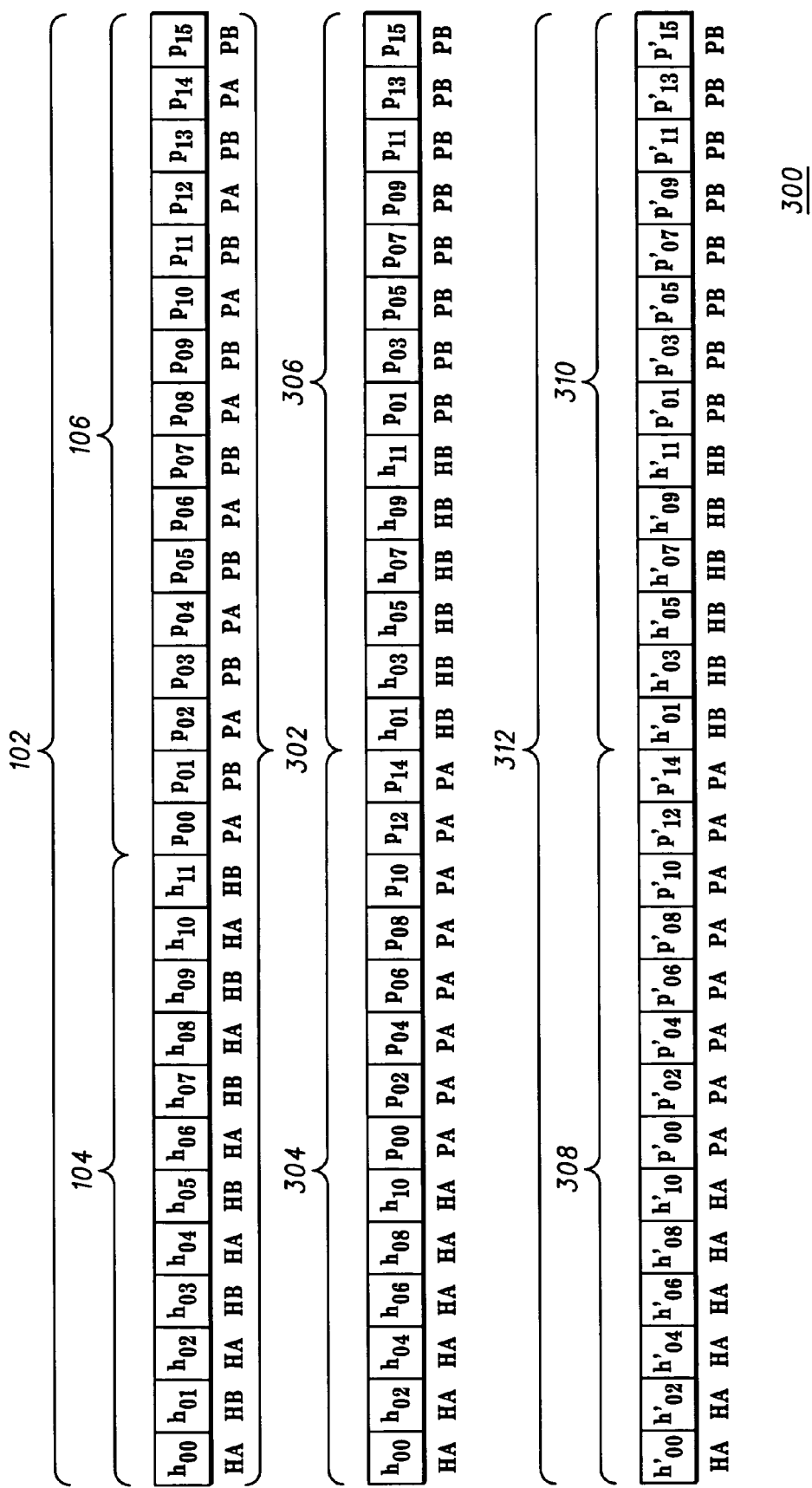
FIG. 3 is an exemplary block diagram of frames of bits illustrating the processing of the header bits and payload bits of a frame as described in FIG. 2.

FIG. 3 is an exemplary block diagram 300 of frames of bits illustrating the processing of the header bits 104 and payload bits 106 of the frame of bits 102 being processed as described in FIG. 2. For this example, the two classes of bits are Class A and Class B, and each bit having an even number designation such as $h_{00}$ and $p_{02}$ are known to belong to Class A, and each bit having an odd number designation such as $h_{01}$ and $p_{03}$ are known to belong to Class B. A classification of each bit is shown with a two-letter indicator 302, with the first letter indicating a bit type, H for a header bit and P for a payload bit, and the second letter indication a bit class, A for Class A and B for Class B. Once the header bits 104 and the payload bits 106 are classified, the bits are grouped together based upon their classifications as grouped Class A bits 304 and grouped Class B bits 306. The grouped Class A bits 304 are then processed in accordance with a first predetermined method associated with Class A, and yield processed-grouped Class A bits 308. Each of processed grouped Class A bits 308 is designated by a prime (') to indicate the processed status such as the original header bit $h_{00}$ now shown as the processed header bit $h'_{00}$. Similarly, the grouped Class B bits 306 are processed in accordance with a second predetermined method associated with Class B, and yield processed-grouped Class B bits 310, each of which is designated by a prime (') to indicate the processed status. The combination of the processed-grouped Class A bits 308 and the processed-grouped Class B bits 310 now make a new frame of bits 312.

Figure 4:
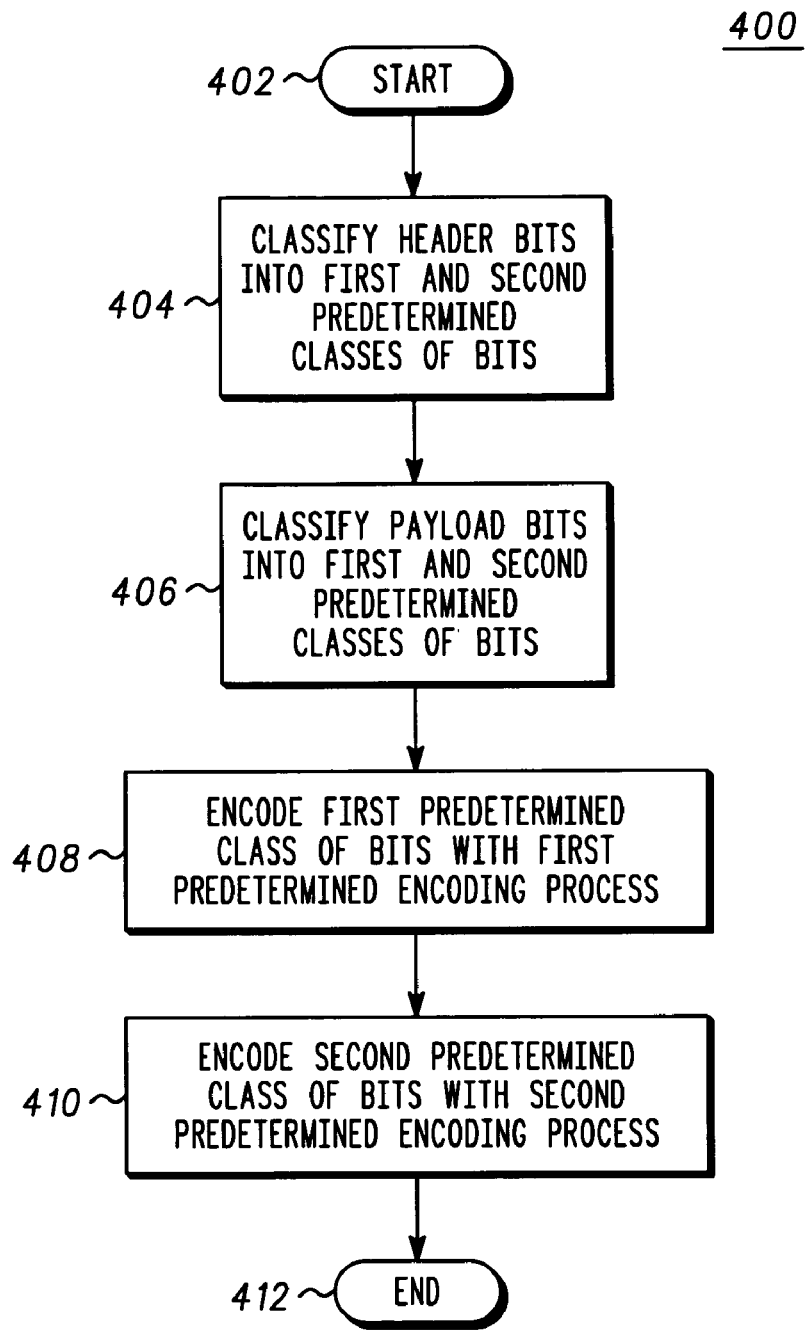
FIG. 4 is an exemplary flowchart of an embodiment in accordance with the present invention for reducing an encoded frame size of a frame of bits such as the frame of bits illustrated in FIG. 1.

FIG. 4 is an exemplary flowchart 400 of an embodiment in accordance with the present invention for reducing an encoded frame size of a frame of bits such as the frame of bits 102 illustrated in FIG. 1. Generally, to provide a sufficient level of encoding protection to an entire frame of bits, which comprises a plurality of bits requiring varying degrees of encoding, it is necessary to apply the highest degree of the varying degrees of encoding to the entire frame of bits. This application of the highest degree of the varying degrees of encoding to the entire frame of bits necessitates encoding some bits of the frame of bits with more than sufficient encoding processes, and inefficiently utilizes the encoding process. By separating the frame of bits into separate classes and encoding each class with its specific encoding process, the overall encoding process of the frame of bits is reduced, and the resulting size of the encoded frame size may be reduced.

The process begins in block 402. Although there may be more than two classes of bits, only two classes are used to illustrate an embodiment of the present invention. In block 404, the header bits in the header field 104 are classified into a first predetermined class of bits and into a second predetermined class of bits. In block 406, the payload bits in the payload field 106 are classified into the first predetermined class of bits and into the second predetermined class of bits. As previously described, the classification of header and payload bits may be based upon several conditions such as a bit location within its respective field, or a pre-assigned weight of each bit. Then in block 408, the first predetermined class of bits is encoded with a first encoding process, and the second predetermined class of bits is encoded with a second encoding process in block 410, where the first encoding process is different from the second encoding process. For example, the first encoding process may have a higher coding rate than that of the second encoding process, thereby affording a higher level of encoding protection to the first predetermined class of bits than the second predetermined class of bits. The process then terminates in block 412. The first predetermined class of bits may be first grouped then be encoded as a group, or may be encoded first and then be grouped. Similarly, the second predetermined class of bits may be first grouped then be encoded as a group, or may be encoded first and then be grouped. A new frame of bits may then be constructed based upon the encoded first and second classes of bits, or based upon the grouped-and-encoded first and second classes of bits.

Figure 5:
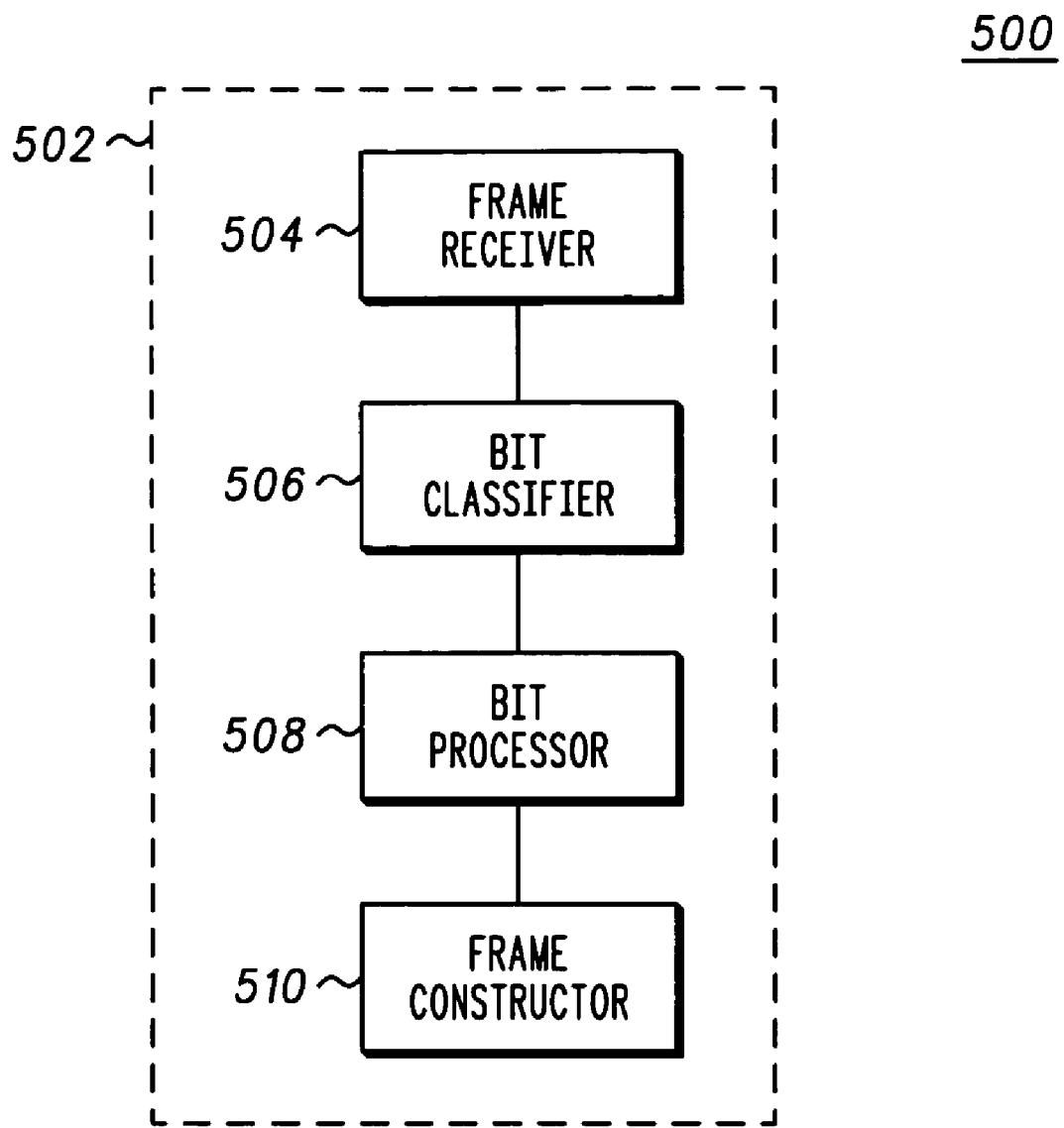
FIG. 5 is an exemplary block diagram of a packet switched data transfer device in accordance with the present invention.

FIG. 5 is an exemplary block diagram 500 of a packet switched data transfer device 502 in accordance with the present invention. The packet switched data transfer device 502 may be a wired or wireless device, and may be implemented with in a larger device generally designed to handle data transfer such as, but not limited to, personal computers, servers, personal digital assistants, and cellular telephones. The packet switched data transfer device 502 comprises three major components: a frame receiver 504, a bit classifier 506, and a bit processor 508. The frame receiver 504 is configured to receive a frame of bits, which comprises a plurality of header bits and a plurality of payload bits. The bit classifier 506 is coupled to the frame receiver 504, and is configured to classify the plurality of header bits and the plurality of payload bits into a first class of bits and into a second class of bits. The bit processor 508 is coupled to the bit classifier 506, and is configured to process the first class of bits according to a first predetermined process and to process the second class of bits according to a second predetermined process. The first predetermined process may have a first coding rate that is higher than a second coding rate of the second predetermined process. The bit classifier 506 may be further configured to classify each bit in the frame of bit based upon various conditions. For example, the bit classifier 506 may be configured to classify each header bit of the plurality of header bits based upon a location of the header bit in the frame of bits, and to classify payload bits of the plurality of payload bits based upon a location of the payload bit in the frame of bits. Alternatively, the bit classifier 506 may be configured to classify each header bit of the plurality of header bits based upon a pre-assigned header weight of the header bit and to classify each payload bit of the plurality of payload bits based upon a pre-assigned payload weight of the payload bit. The packet switched data transfer device 502 may further include a frame constructor 510, which is coupled to the bit processor 508, and is configured to construct a new frame of bits based upon the processed first class of bits and the processed second class of bits. Although the packet switched data transfer device 502 has been described as comprising various discrete modules, the packet switched data transfer device 502 may be realized within a microprocessor having various software modules.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a packet switched data transfer system for processing header bits and payload bits in a frame of bits, the method comprising:
   classifying at a data transfer device each of the header bits in the frame into a first predetermined class of bits and into a second predetermined class of bits based upon a location of the header bit in the frame of bits;
   classifying at the data transfer device each of the payload bits in the frame into the first predetermined class of bits and into the second predetermined class of bits based upon a location of the payload bit in the frame of bits;
   processing at the data transfer device the first predetermined class of bits, in the frame, in accordance with a first predetermined mechanism; and
   processing at the data transfer device the second predetermined class of bits, in the frame, in accordance with a second predetermined mechanism.

2. The method of claim 1, further comprising:
   constructing at the data transfer device a new frame of bits based upon the processed first predetermined class of bits and the processed second predetermined class of bits.

3. The method of claim 1, wherein:
   processing at the data transfer device the first predetermined class of bits in accordance with the first predetermined mechanism includes grouping the first predetermined class of bits; and
   processing at the data transfer device the second predetermined class of bits in accordance with the second predetermined mechanism includes grouping the second predetermined class of bits.

4. The method of claim 1, further comprising:
   grouping at the data transfer device the processed first predetermined class of bits;
   grouping at the data transfer device the processed second predetermined class of bits; and
   constructing at the data transfer device a new frame of bits based upon the grouped-processed first predetermined class of bits and the grouped processed second predetermined class of bits.

5. The method of claim 1, wherein:
   the first predetermined mechanism includes applying a first error protection algorithm, and
   the second predetermined mechanism includes applying a second error protection algorithm.

6. A method in a packet switched data transfer system for processing header bits and payload bits in a frame of bits, the method comprising:
   classifying at a data transfer device each of the header bits in the frame into a first predetermined class of bits and into a second predetermined class of bits based upon a pre-assigned header weight of the header bit;
   classifying at the data transfer device each of the payload bits in the frame into the first predetermined class of bits and into the second predetermined class of bits based upon a pre-assigned payload weight of the payload bit;
   processing at the data transfer device the first predetermined class of bits, in the frame, in accordance with a first predetermined mechanism; and
   processing at the data transfer device the second predetermined class of bits, in the frame, in accordance with a second predetermined mechanism.

7. A packet switched data transfer device comprising:
   a frame receiver configured to receive a frame of bits, the frame of bits comprising a plurality of header bits and a plurality of payload bits;
   a bit classifier coupled to the frame receiver, the bit classifier configured to classify each of the plurality of header bits into a first class of bits and into a second class of bits based upon a location of the header bit in the frame of bits and each of the plurality of payload bits into a first class of bits and into a second class of bits based upon a location of the payload bit in the frame of bits; and
   a bit processor coupled to the bit classifier, the bit processor configured to process the classified first class of bits, in the frame, according to a first predetermined process and to process the classified second class of bits, in the frame, according to a second predetermined process.

8. The packet switched data transfer device of claim 7, wherein:
   the first predetermined process has a first coding rate, and
   the second predetermined process has a second coding rate, the second coding rate less than the first coding rate.

9. The packet switched data transfer device of claim 7, further comprising:
   a frame constructor coupled to the bit processor, the frame constructor configured to construct a new frame of bits based upon the processed first class of bits and the processed second class of bits.

10. A packet switched data transfer device comprising:
    a frame receiver configured to receive a frame of bits, the frame of bits comprising a plurality of header bits and a plurality of payload bits;
    a bit classifier coupled to the frame receiver, the bit classifier configured to classify each header bit of the plurality of header bits into a first class of bits and into a second class of bits based upon a pre-assigned header weight of the header bit and to classify each payload bit of the plurality of payload bits into a first class of bits and into a second class of bits based upon a pre-assigned payload weight of the payload bit; and
    a bit processor coupled to the bit classifier, the bit processor configured to process the classified first class of bits, in the frame, according to a first predetermined process and to process the classified second class of bits, in the frame, according to a second predetermined process.

* * * * *